(12) United States Patent
Hendrickx et al.

(10) Patent No.: US 8,771,797 B2
(45) Date of Patent: Jul. 8, 2014

(54) AQUEOUS COATING COMPOSITION

(75) Inventors: Georges Hendrickx, Keerbergen (BE); Jozef Theresia Huybrechts, Turnhout (BE); Christiaan Engels, Mechelen (BE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 234 days.

(21) Appl. No.: 13/122,628

(22) PCT Filed: Oct. 29, 2009

(86) PCT No.: PCT/US2009/062462
§ 371 (c)(1),
(2), (4) Date: Apr. 5, 2011

(87) PCT Pub. No.: WO2010/059353
PCT Pub. Date: May 27, 2010

(65) Prior Publication Data
US 2011/0183075 A1    Jul. 28, 2011

Related U.S. Application Data

(60) Provisional application No. 61/197,816, filed on Oct. 30, 2008.

(51) Int. Cl.
*B05D 3/02* (2006.01)
*C08F 290/06* (2006.01)

(52) U.S. Cl.
USPC .................................... 427/385.5; 524/558

(58) Field of Classification Search
USPC .............................................. 524/558
See application file for complete search history.

(56) References Cited

U.S. PATENT DOCUMENTS 2,677,671 A * 5/1954 Yuska et al. ............... 528/111.5
4,312,797 A * 1/1982 Aihara et al. ................ 524/549

* cited by examiner

*Primary Examiner* — Ling Choi
*Assistant Examiner* — Catherine S Branch
(74) *Attorney, Agent, or Firm* — Ingrassia Fisher & Lorenz, P.C.

(57) ABSTRACT

The invention relates to aqueous coating compositions comprising a cross-linkable binder resin and a liquid carrier, wherein said cross-linkable binder resin comprises a copolymer A) comprising:
5 to 64% by weight of a reaction product of at least one fatty acid having at least one ethylenically double bond and one hydroxyl group in the molecule with a polyalcohol having a hydroxyl functionality of 2 to 8, wherein the % by weight are relative to the binder solids of copolymer A).

16 Claims, No Drawings

AQUEOUS COATING COMPOSITION

CROSS-REFERENCE TO RELATED APPLICATION

This is a continuation of International Application No. PCT/US2009/062462, filed Oct. 29, 2009, which was published under PCT Article 21(2), which claims the benefit of U.S. Provisional Application 61/197816, filed Oct. 30, 2008.

FIELD OF THE INVENTION

The invention relates to a curable aqueous coating composition which coating composition may in particular be used in automotive and industrial coatings.

DESCRIPTION OF PRIOR ART

Against the background of increasingly stringent environmental legislation, water-based coating compositions have become more and more important in recent years in various fields of application, including, automotive coatings. A number of clear and pigmented aqueous coating compositions are utilized in various coatings, such as, for example aqueous basecoats, clear coats and topcoats. The aim of this is to keep the proportion of organic co-solvents in the water based coating compositions as small as possible.

However, the water-based coating compositions produced do not in all respects achieve the high quality levels of conventional solvent-based coating compositions.

There have been numerous attempts in the past to eliminate or at least mitigate the disadvantages of the prior art, for example by developing suitable water-soluble or water-dispersible binders for the water-based coating compositions.

It is well-known to use, for example, water-dilutable acrylate copolymers as water-dilutable binder in water-based coating compositions. Those water-dilutable acrylate copolymers are usually manufactured in organic solvents in a one or several step process. The solvents have to be distilled off at a later stage to reduce the amount of organic solvents.

To avoid expensive distillation process it is known to replace at least part of the organic solvents by specific reactive solvents, that become a part of the binder. It is also known to polymerize unsaturated monomers in presence of polymeric or oligomeric polyesters.

For example, in U.S. Pat. No. 5,773,513 aqueous coating compositions based on water-dilutable acrylate resins are described, the acrylate resins being manufactured in several stages by polymerization in organic solvents. In this procedure, a reaction product of a monoepoxyester and an unsaturated acid functional monomer and organic solvent are introduced, in a first stage unsaturated acid-functional monomers, unsaturated hydroxy-functional monomers and vinyl aromatic monomers are added and polymerized and in a second stage the remaining unsaturated acid-functional monomers and, possibly, further unsaturated monomers are added and polymerised. One feed stream comprises 5-60% by weight of the unsaturated acid functional monomer, 40-95% by weight of the reaction product of a monoepoxyester and an unsaturated acid functional monomer, and 0-55% by weight of the other polymerisable compounds. After neutralization and transfer to the aqueous phase, surplus solvent is distilled off.

But aqueous coating compositions based on those acrylate resins do not give a good shelf stability and good overall productivity in drying performance and have a unfavourable solids viscosity. Also, the monomers, in particular the reaction products of monoepoxyesters and an unsaturated acid functional monomer, used as polymerization medium are relatively costly.

Furthermore, EP 1 285 035 discloses water-based coating compositions comprising an aqueous dispersion of a polyester-polyacrylate hybrid resin which hybrid resin is obtainable by grafting a composition of radically polymerisable monomers onto a partially unsaturated hydroxyl-functional polyester. The partially unsaturated hydroxyl-functional polyester is obtained by reaction of a mixture of polycarboxylic and, optionally monocarboxylic acids, at least 50 mole-% of these acids are aliphatic acids with 6-12 carbon atoms, with (cyclo) aliphatric alcohols comprising an aliphatic or cycloaliphatic diol, wherein 0.5-6 mole-% of the acids and/or alcohols are unsaturated. The water-based coating compositions do not cause excessive foaming during spraying and show acceptable pot life.

WO 2007/090640 discloses an aqueous multi-component system comprising a water-dispersible (meth)acrylate copolymer and a low molecular oligomeric, essentially unbranched hydrophobic polyester having at least two hydroxyl groups in the molecule. The aqueous multi-component system is preferably cured with UV radiation.

Thus, a continuing need still exists for curable aqueous coating compositions which can be produced with lower costs and with which a high quality level of coatings can be achieved. The coating compositions shall have a favourable solids viscosity, give good drying performance, and shall provide coatings with good mechanical properties, e.g. good hardness and scratch resistance, as well as satisfactory optical appearance.

SUMMARY OF THE INVENTION

The present invention relates to an aqueous coating composition comprising a cross-linkable binder resin and a liquid carrier, wherein said cross-linkable binder resin comprises:

at least one copolymer A) having cross-linkable reactive groups, said copolymer A) comprises:

5 to 64% by weight, preferably 10 to 50% by weight, most preferred 15 to 40% by weight of a reaction product of at least one fatty acid having at least one ethylenic double bond and one hydroxyl group in the molecule with a polyalcohol having a hydroxyl functionality of 2 to 8, wherein the % by weight are relative to the binder solids of copolymer A).

DETAILED DESCRIPTION OF THE INVENTION

These and other features and advantages of the present invention will be more readily understood, by those of ordinary skill in the art, from a reading of the following detailed description. It is to be appreciated those certain feature of the invention, which are, for clarity, described above and below in the context of separate embodiments, may also be provided in combination in a single embodiment. Conversely, various feature of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about". In this manner slight variations above and below the stated ranges can be used to achieve substantially the same results as value within the ranges. Also, the disclosure of these ranges is intended as continuous range including every value between the minimum and maximum values, including the minimum and maximum end points of the range.

The term (meth)acrylic as used here and hereinafter should be taken to mean methacrylic and/or acrylic.

Unless stated otherwise, all molecular weights (both number and weight average molecular weight) referred to herein are determined by GPC (gel permeation chromatographie) using polystyrene as the standard and tetrahydrofurane as the liquid phase.

Unless stated otherwise, all hydroxyl, acid or amine numbers are given in mg KOH/g solids.

Aqueous coating compositions are coating compositions, wherein water is used as solvent or thinner when preparing and/or applying the coating composition. Usually, aqueous coating compositions contain 20 to 80% by weight of water, based on the total amount of the coating composition and optionally, up to 15% by weight, preferably, below 10% by weight of organic solvents, based on the total amount of the coating composition.

Liquid carrier means water or a mixture of water and at least one organic solvent, whereby the mixture contains maximal 40% by weight of the organic solvent. Preferably the liquid carrier contains 70 to 100% by weight of water.

Here and hereinafter the reaction product of the at least one fatty acid having at least one ethylenic double and one hydroxyl group in the molecule with a polyalcohol having a hydroxyl functionality of 2 to 8 shall be referred to as monomer a).

Copolymer A) is a copolymer prepared by radical polymerization of unsaturated monomers a) and further unsaturated monomers b) in a solvent. Unsaturated monomers b) contain hydrophilic ionic groups, preferably carboxylic acid groups and/or amino groups. Copolymer A) has an acid value of at least 10 mg KOH/g resin solids, preferably of 15 to 80 mg KOH/g resin solids, a hydroxyl value of 50 to 250 mg KOH/g resin solids and a number average molecular weight Mn of 800 to 8000. In one embodiment copolymer A) comprises 5 to 64% by weight of at least one monomer a) and 36 to 95% by weight of at least one monomer b), wherein the % by weight are adding up to 100%.

In particular copolymer A) comprises
a) 5 to 64% by weight of at least one reaction product of at least one fatty acid having at least one ethylenic double bond and one hydroxyl group in the molecule with a polyalcohol having a hydroxyl functionality of 2 to 8 (monomer a) and
b) 36 to 95% by weight of unsaturated monomers comprising:
b1) at least one hydroxyl-functional unsaturated monomer,
b2) at least one acid-functional unsaturated monomer and
b3) optionally at least one other polymerizable unsaturated monomer different from monomers b1) and b2), wherein the % by weight are adding up to 100%.

Monomer a) is the reaction product of at least one fatty acid having at least one ethylenic double and one hydroxyl group in the molecule with a polyol having a hydroxyl functionality of 2 to 8.

Fatty acids having 8 to 24 carbon atoms, preferably 10 to 24 carbon atoms, in the molecule, may be used. A preferred example of a useful fatty acid is ricinoleiceic acid (castor oil fatty acid).

Preferred polyalcohols are monomeric polyalcohols, in particular monomeric polyalcohols with a number average molecular weight of 62 to 362. Examples of suitable polyalcohols having a hydroxyl functionality of 2 are alkylene glycols and alkane diols, such as ethylene glycol, propylene glycol, dipropylene glycol, diethylene glycol, triethylene glycol, neopentylglycol, 1,3-pentanediol, 1,2-propandiol, 1,3-, 1,4- and 2,3-butanediol, 1,5-pentanediol, 1,6-hexanediol, dimethylolpropane. Examples of suitable polyols having a hydroxyl functionality of 3 and more are glycerine, trimethylolpropane, triethylolpropane, 1,2,4-butantriol, mono-pentaerythritol, di-pentaerythritol and tri-pentaerythritol.

Preferred monomers a) are reaction products of fatty acids having 12-24 carbon atoms in the molecule with a polyalcohol having a hydroxyl functionality of 2 to 8. These are, for example, the reaction products of ricinoleic acid and a polyalcohol having a hydroxyl functionality of 2 to 8. Most preferred is the di- or triglyceride of ricinoleic acid.

The monomers a) prepared by reacting at least one fatty acid having at least one ethylenic double and one hydroxyl group in the molecule with a polyalcohol having a hydroxyl functionality of 2 to 8 can be mono- or diesters or compounds containing more than two ester groups in the molecule. The polyalcohols may be completely or only partly esterified, i.e. only one hydroxyl group, a part of the hydroxyl groups or all hydroxyl groups of the polyalcohol may be reacted with the fatty acid as defined above to form an ester bond. If the polyalcohols are not completely esterified the monomer a) still contain one or more hydroxyl groups in addition to the one hydroxyl group incorporated by the fatty acid.

It is an advantage of the copolymers A used in the coating compositions of the present invention that in particular natural oils can be used as monomer a).

A preferably useful monomer a) is castor oil. Castor oil is a natural product and mainly comprises the triglyceride of castor oil fatty acid (ricinoleic acid). Natural castor oil is, for example, a mixture of 80-88% by weight of the triglyceride of castor oil fatty acid (ricinoleic acid), 4-7% by weight of the triglyceride of oleic acid, 3-5% by weight of linoleic acid, 1, 5-2% by weight of palmitic acid and 1-1.5% by weight of stearic acid. Since castor oil is a cheap and renewable resource its use allows to prepare the copolymers A) in a cost saving way. Castor oil is commercially available, for example from the company Mosselmann, Belgium.

Castor oil can be used in combination with other monomers a). Generally a single monomer a) or a combination of different monomers a) can be used.

Monomers a) also include those reaction products, wherein at least one hydroxyl group, but not all hydroxyl groups of the polyalcohol are reacted with a fatty acid as defined above and wherein the remaining hydroxyl groups of the polyalcohol are reacted completely or partly with fatty acids different from those as defined above. For example, saturated fatty acids and/or unsaturated fatty acids having no hydroxyl group in the molecule can be used in addition to the above defined fatty acids. Examples for additionally useful fatty acids are saturated fatty acids with 10 to 24 carbon atoms, such as stearic acid, lauric acid, palmitic acid. Further examples for additionally useful fatty acids are single or multiple unsaturated fatty acids having no hydroxyl group in the molecule, such as oleic acid, linolenic acid, linoleic acid.

The copolymer A) further comprises unsaturated monomers b). In one embodiment monomers b) comprising
b1) 0 to 60% by weight, preferably 10 to 40% by weight, of at least one hydroxy functional unsaturated monomer,
b2) 2 to 40% by weight, preferably 4 to 20% by weight, of at least one acid functional unsaturated monomer and
b3) 0 to 50% by weight, preferably 20-50% by weight, of at least one other polymerisable unsaturated monomer, wherein the % by weight of monomers b1) to b3) is relative to the binder solids of copolymer A).

Thus copolymer A) comprises at least one monomer a) and monomers b1) to b3). In one embodiment copolymer A) comprises 5 to 64% by weight of monomer a) and 36 to 95% by weight of monomers b1) to b3), wherein the % by weight are adding up to 100%. In a further embodiment copolymer A) consists of 5 to 64% by weight of monomer a) and 36 to 95% by weight of monomers b1) to b3), wherein the % by weight are adding up to 100%.

Monomer b1) relates to hydroxy-functional unsaturated monomers. Examples of monomer b1) are hydroxyalkyl esters with primary or secondary hydroxyl groups derived from alpha, beta-ethylenically unsaturated monocarboxylic acids. These can include, for example, hydroxyalkyl esters from acrylic acid, methacrylic acid, crotonic acid and/or isocrotonic acid. Hydroxyalkyl esters derived from (meth) acrylic acid are preferred. The hydroxyalkyl groups can contain, for example, 1 to 10 C atoms, preferably 2 to 6 C atoms. Examples of suitable hydroxyalkyl esters of alpha, beta-ethylenically unsaturated monocarboxylic acids with primary hydroxyl groups are hydroxyethyl (meth)acrylate, hydroxypropyl (meth)acrylate, hydroxybutyl (meth)acrylate, hydroxyamyl (meth)acrylate, hydroxyhexyl (meth)acrylate. Examples of suitable hydroxyalkyl esters with secondary hydroxyl groups are 2-hydroxypropyl (meth)acrylate, 2-hydroxybutyl (meth)acrylate, 3-hydroxybutyl (meth)acrylate. Also, monomers such as polyalkyleneglycol (meth)acrylates, e.g. polyethyleneglycol (meth)acrylate or polypropyleneglycol (meth)acrylate monomers can be used.

Reaction products from hydroxyalkyl (meth)acylates with lactones can also be used as monomer b1). The aforementioned are examples of hydroxyalkyl (meth)acrylates that can be used. Suitable lactones are, for example, those that contain 3 to 15 C atoms in a ring, it is possible for the rings to have different substituents. Preferred lactones are gamma-butyrolactone, delta-valerolactone, epsilon-caprolactone, beta-hydroxy-beta-methyl-delta-valerolactone, lambda-laurinlactone or mixtures thereof. Epsilon-caprolactone is particularly preferred. The reaction products preferred are those of one mol of a hydroxyalkyl ester of an alpha, beta-unsaturated monocarboxylic acid and 1 to 5 mol, preferably an average of 2 mols, of a lactone. Modification of the hydroxyl groups of the hydroxyalkyl esters with the lactone can take place before, during or after carrying out the copolymerization reaction.

Reaction products of a monoepoxyester and unsaturated acid functional compounds can also be used as monomer b1). These monoepoxy esters are preferably glycidyl esters derived from aliphatic saturated monocarboxylic acids with a tertiary or quaternary carbon atom in the alpha position. It is preferred to use glycidyl esters of saturated alpha, alpha-dialkylalkane-monocarboxylic acids with 5 to 13 C atoms in the acid molecule, in particular, preferably, 9 to 11 C atoms in the acid molecule. Examples for glycidylesters are the glycidyl esters derived from versatic acid. Suitable monoepoxyesters of this type are obtainable commercially, for example, under the name of Cardura®. Examples for unsaturated acid functional compounds are aliphatic unsaturated monocarboxylic acids such as (meth)acrylic acid, crotonic acid and isocrotonic acid.

Monomer b2) relates to unsaturated acid functional monomers. Examples of suitable monomers b2) are polymerizable ethylenically unsaturated carboxyl-functional monomers such as ethylenically unsaturated mono- and/or dicarboxylic acids, e.g. (meth)acrylic acid, maleic acid, fumaric acid, crotonic acid and isocrotonic acid as well as the corresponding semi-esters and anhydrides of ethylenically unsaturated dicarboxylic acids. The acid residue of these carboxylic acids has generally 1 to 8 C atoms. The use of (meth)acrylic acid is particularly preferred.

Monomer b3) relates to unsaturated monomers, which differ from monomers a), b1) and b2). It can include ethylenically unsaturated monomers that, apart from having at least one ethylenically double bond, do not contain any other reactive functional groups. Examples of suitable unsaturated monomers with no other functional groups are esters of unsaturated carboxylic acids with aliphatic monohydric branched or linear as well as cyclic alcohols with 1 to 20 C atoms. Examples of unsaturated carboxylic acids are acrylic acid, methacrylic acid, crotonic acid and isocrotonic acid. Esters of (meth)acrylic acid are preferred. Examples of (meth)acrylic acid esters with aliphatic alcohols are methylacrylate, ethylacrylate, isopropylacrylate, tert.-butylacrylate, n-butylacrylate, isobutylacrylate, 2-ethylhexylacrylate, laurylacrylate, stearylacrylate and appropriate methylacrylates. Examples of (meth)acrylic acid esters with cyclic alcohols are cyclohexylacrylate, trimethylcyclohexylacrylate, 4-tert. butylcyclohexylacrylate, isobornylacrylate and appropriate methacrylates. Examples of (meth)acrylic acid esters with aromatic alcohols are benzyl(meth)acrylates.

Examples of further but not preferred suitable unsaturated monomers without other functional groups are vinyl esters, such as, for example, vinyl acetate, vinyl propionate and vinyl esters derived from branched vinyl esters, such as, for example, vinyl acetate, vinyl propionate and vinyl esters derived from branched saturated monocarboxylic acids in alpha position, for example, vinyl esters derived from saturated alpha, alpha' dialkylalkane monocarboxylic acids and vinyl esters derived from saturated alpha-alkylalkane monocarboxylic acids each with 5 to 13 carbon atoms, preferably, 9 to 11 carbon atoms in the molecule.

Examples of further suitable unsaturated monomers without other functional groups are vinylaromatic monomers, for example, styrene, vinyl toluene and/or tertiary butyl styrene.

Small amounts of ethylenically polyunsaturated monomers can also be used. These are monomers with at least 2 radically polymerizable double bonds. Examples of these are divinylbenzene, 1,4-butanediol diacrylate, 1,6-hexanediol diacrylate, neopentylglycoldimethacrylate, glycerine dimethacrylate.

Monomer b3) may also include ethylenically unsaturated monomers with other functional groups, for example (meth) acrylamides and their derivatives, (meth)acrylonitriles, silane-functional unsaturated monomers, such as, for example, methacryloxypropyl trialkoxysilanes, vinyl trialkoxysilanes, each with, for example, 1 to 5 carbon atoms in the alkoxy group, acetoacetyl-functional unsaturated monomers, such as, for example, acetoacetoxy ethylmethacrylate, unsaturated monomers containing urea groups, such as, for example, ethylene urea ethyl methacrylate and unsaturated monomers containing amino groups, such as, for example, dialkylamino ethyl (meth)acrylates with, for example, 1 to 5 carbon atoms in the alkyl group and heterocyclic monomers, e.g. vinyl imidazole.

Preferably copolymer A) comprises as monomer b3) esters of unsaturated carboxylic acids with aliphatic monohydric branched or linear as well as cyclic alcohols with 1 to 20 C atoms and/or vinylaromatic monomers. Most preferred are (meth)acrylic acid esters with aliphatic monohydric branched or linear as well as cyclic alcohols with 1 to 20 C atoms, optionally in combination with vinylaromatic monomers, such as styrene.

Therefore a preferred copolymer A) comprises:
a) 5 to 64, preferably 15 to 40% by weight of at least one monomer a)
b1) 0 to 60, preferably 10 to 40% by weight of at least one hydroxyalkyl ester with primary or secondary hydroxyl groups derived from alpha, beta-ethylenically unsaturated monocarboxylic acids.
b2) 2 to 40, preferably 4 to 20% by weight of at least one unsaturated acid functional monomer and
b3.1) 0 to 50% by weight of at least one ester of (meth)acrylic acid with aliphatic monohydric branched or linear as well as cyclic alcohols with 1 to 20 C atoms and
b3.2) 0 to 50% by weight of at least one vinylaromatic unsaturated monomer,
wherein the % by weight of monomers a) and b) 1 to b3.2) are adding up to 100% by weight.

According to a further embodiment copolymers A) comprise in particular 5 to 64 by weight, preferably 15 to 40% by weight, of the triglyceride of ricinoleic acid and 36 to 95% by weight, preferably 60 to 85% by weight of monomers b1) to b3), wherein monomers b1) to b3) are preferably monomers b1) to b3.2) as defined above and by weight are adding up to 100% by weight.

According to a further embodiment copolymers A) comprise preferably 15 to 40% by weight of castor oil and 60 to 85% by weight of monomers b1) to b3), wherein monomers b1) to b3) are preferably monomers b1) to b3.2) as defined above and % by weight are adding up to 100% by weight.

The copolymers A contained in the coating compositions according to the invention are produced by radical copolymerization in a solvent. Radical polymerization is following the usual methods known by a person skilled in the art. Copolymer A) is prepared by polymerizing monomer a) and monomers b1) to b3). In one preferred embodiment monomer a) is used as polymerization medium and monomers b1) to b3) are polymerized in presence of monomer a), preferably in presence of at least 20% by weight of the total amount of monomer a).

Copolymer A) can be prepared in a one-step process or by a skew feed polymerization process with at least two feed streams (at least two steps).

More specifically, the copolymer A) can be made by first charging a reflux reactor with a first quantity of monomer a) and an organic solvent or solvent blend. The temperature of the reactor contents is typically held between 60° C. and 280° C. during polymerization. For example a first feed stream comprising a mixture of optionally a second quantity of monomer a), a first quantity of unsaturated hydroxyfunctional monomer, a further unsaturated monomer and an initiator is charged to the reactor over a period of time. After addition of the first feed stream, the reactor contents are rinsed with additional organic solvent. A second feed stream comprising for example, a second quantity of the unsaturated hydroxyl-functional monomer, a quantity of an unsaturated acid-functional monomer, in an amount to provide the copolymer with the desired acid number, further unsaturated monomers, additional organic solvent, and additional initiator is charged to the reactor over a period of time.

According to a further embodiment the copolymer A) can also be made by a one-step polymerization process.

Preferably the copolymer A) is made by using at least 20% by weight, more preferred 30 to 100% by weight, most preferred 50 to 100% by weight, of the total amount of monomer a) as polymerization medium in a one-step or multi-step polymerization process. Thereby monomer a) can be present prior to charging the reactor with monomers b) or can be introduced directly in the monomer feed. The rest of monomer a) can be added during a second polymerization step and/or can be added after polymerization of monomers b).

When monomer a) is not used as polymerization medium, e.g. the total amount of monomer a) is added only in a second polymerization step and/or after polymerization of monomers b), the final polymer dispersion might not be stable.

In a further embodiment of the present invention the copolymer A) can be prepared by using a macromonomer. Therefore, copolymer A) can be a graft copolymer comprising:
8-92% by weight of the graft copolymer of a polymeric backbone of polymerized monomer a) and unsaturated monomers b) and
92 to 8% by weight of the graft copolymer, of a macromonomer c) attached to said polymeric backbone at a single terminal point of said macromonomer, wherein the % by weight are adding up to 100%, said macromonomer having a number average molecular weight of 500-8000, preferably of 500-7000 and comprising 10 to 100% by weight of the macromonomer, of acid and/or amine functional ethylenically unsaturated monomers.

For example those macromonomers can be used as described in U.S. Pat. No. 5,936,026 and used in preparing the graft copolymers. After at least partial neutralization of the ionic groups these macromonomers form stable solutions or dispersions in water. The macromonomer preferably contains carboxyl groups.

The macromonomer c) is preferably prepared using a free radical initiator in a solvent with a Co (II) or Co (III) chelate chain transfer agent and contains 10 to 100 percent, preferably 20 to 40 percent, by weight of an acid- or amine-functional unsaturated monomer. Examples of acid-functional monomers are acrylic acid, methacrylic acid, maleic acid, and itaconic acid or their anhydrides (which can be hydrolyzed to the acid after polymerization). Examples of amine-functional monomers are t-butylamino ethyl methacrylate, diethyl (or dimethyl)amino ethyl acrylate, diethyl amino ethyl methacrylate, and the like. Preferably the macromonomer is based on acid-functional monomers, most preferred on (meth) acrylic acid. In addition to the acid- or amine-functional monomer, up to 90% by weight, based on the weight of the macromonomer, of other polymerized ethylenically unsaturated monomers can be present. Other ethylenically unsaturated monomers can be, for example, the same unsaturated monomers as described for monomers b).

The copolymer A) may be prepared by polymerizing ethylenically unsaturated monomers in the presence of macromonomers c) each having a terminal ethylenic unsaturation for grafting. To ensure that the resulting macromonomer only has one terminal ethylenically unsaturated group which will polymerize with the other monomers to form copolymer A, the macromonomer is polymerized by using a catalytic chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps additional monomers and cobalt catalyst and conventional polymerization catalyst are added and polymerization is continued until a macromonomer is formed of the desired molecular weight.

Suitable cobalt chain transfer agents or catalysts are described in U.S. Pat. Nos. 4,680,352, 4,722,984 and WO 87/03605. Preferred are pentacyanocobaltate (II or III), diaquabis(borondifluorodimethyl-glyoximato) cobaltate (II or III) and diaquabis(borondifluorophenylglyoximato) cobaltate (II or III). Ethylenically unsaturated sulfonic, sulfinic, phosphoric or phosphonic acid and esters thereof also can be used such as styrene sulfonic acid, acrylamido methyl propane sulfonic acid, vinyl phosphonic acid can also be used. Typically these chain transfer agents are used at concentrations of about 5-1000 ppm based on the monomers used.

Generally the relatively hydrophobic monomer a), e.g. the di- or triglyceride of ricinoleic acid or the castor oil, i.e. the part of the copolymer formed by monomer a) has to be stabilized in the aqueous phase. It is assumed that this can be done, for example, with ionic groups, in particular acid groups of monomers b) and/or of macromonomer c).

Therefore, according to a further embodiment copolymer A) can be prepared by polymerizing monomers b) in presence of a mixture of monomer a) and at least one macromonomer c) as defined above. Preferably monomers b) are polymerized in presence of a mixture containing 20 to 80% by weight of monomer a) and 80 to 20% by weight of macromonomer c), wherein the % by weight of monomer a) and macromonomer c) is adding up to 100% by weight.

Most preferred the absolute amount of monomer a) in the above mixture shall be at least 20% by weight of the total amount of monomer a) used in preparing the copolymer A).

All usual polymerization initiators for radical copolymerization can be considered, such as, aliphatic azo compounds, for example, azobis-isobutyronitrile or azobis-methylbutyronitrile, diazylperoxides, for example, dibenzoylperoxide, dialkylperoxides, for example, di-tertiary-butylperoxide or di-tertiary-amylperoxide, alkylhydroperoxides, for example, tertiary-butylhydroperoxide or peresters, for example, tertiary-butylperoxybenzoate. Chain transfer agents, for example alkylhalides, such as, alkyl bromides, or mercaptanes, such as, dodecylmercaptane, can be used to regulate the molar mass.

Suitable organic co-solvents are inter alia water-dilutable monovalent or bivalent alcohols or glycols, for example, ethanol, n-propanol, isopropanol, n-butanol, isobutanol, ethylene glycol, diethylene glycol, triethylene glycol, propylene glycol and glycerine, water-dilutable monoethers derived from polyhydric alcohols, for example methoxypropanol or methoxybutanol, as well as water-dilutable glycol ethers, such as, for example, butylglycol or butyldiglycol.

The person skilled in the art selects the nature and proportion of components a), b) and c) for the production of copolymers A in such a manner that copolymers A with the desired acid number of at least 10 mg KOH/g resin solids, the desired hydroxyl number and molecular weight are obtained. Acid groups can be introduced via the acid-functional macromonomer c) and/or via acid-functional monomers b). The minimum acid value is required to stabilize the part of copolymer A) containing the hydrophobic monomer a) in the aqueous medium. In addition nonionic stabilization, e.g. with monomers, such as, polyalkyleneglycol (meth)acrylates, is possible.

After the copolymer A is formed, solvent is optionally stripped off, the copolymer A is neutralized and dispersed or dissolved in an aqueous carrier. Neutralization can be performed before or during dispersing or dissolving the copolymer A in the aqueous carrier. The aqueous carrier preferably contains 80-100% by weight of water. As neutralizing agents for the preferred acid groups of copolymer A inorganic bases or amines can be used. Examples of those neutralizing agents are ammonium hydroxide, sodium hydroxide, potassium hydroxide, amino methyl propanol, amino ethyl propanol, dimethyl ethanol amine, triethylamine and the like.

The coating composition according to the invention may comprise other components in addition to copolymer A). The coating composition can comprise, for example, additional water-dilutable binders.

The additional water-dilutable binders which can be used are not subject to any particular restrictions. All water-dilutable binders usually used to prepare aqueous coating compositions, e.g., in the field of automotive and industrial coating can be used as additional binder component. Those water-dilutable binders as well as preparation methods for the binders are known to the person skilled in the art and are disclosed in detail in various patents and other documents. Examples of water-dilutable binders are polyurethane(urea) resins, polyester resins, (meth)acrylic copolymer resins different from copolymer A), epoxy resins, polysiloxane resins, alkyd resins, cellulose esters, melamine resins and any hybrid binders derived therefrom.

Copolymers A contain cross-linkable functional groups suitable for crosslinking reactions with appropriate crosslinkers. The additional water-dilutable binders may contain cross-linkable functional groups as well. Suitable functional groups are, for example, hydroxyl groups, blocked hydroxyl groups, acetoacetyl groups, unsaturated groups, for example, (meth)acryloyl groups and allyl groups, epoxide groups, carboxyl groups, carbamate groups, amine groups and blocked amine groups.

In order to ensure sufficient water dilutability of copolymer A) and the additional binders, these copolymers and binders are modified in a suitable manner to render them hydrophilic.

The coating composition according to the invention may optionally comprise at least one cross-linking agent B) which cross-linking agent is capable of entering into a cross-linking reaction with the reactive functional groups of copolymer A) and additional binder components. The cross-linking agents which can be used are not subject to any particular restrictions. All cross-linking agents usually used to prepare aqueous coating compositions, e.g., in the field of automotive and industrial coating can be used. Those cross-linking agents as well as preparation methods for the cross-linking agents are known to the person skilled in the art and are disclosed in detail in various patents and other documents. Depending on the type of reactive functional groups of binder component A) and the optionally present additional water-dilutable binders the following cross-linking agents may, for example, be used: polyisocyanates with free isocyanate groups or with at least partially blocked isocyanate groups, amine/formaldehyde condensation resins, for example, melamine resins. In a preferred embodiment copolymer A) and the optionally present additional binders contain hydroxyl groups and cross-linking agents with free or blocked polyisocyanate groups are used.

The binder components and the cross-linking agent are used in such proportion that the equivalent ratio of reactive functional groups of copolymer A) and additional binders to the corresponding reactive groups of the cross-linking agent B) can be 5:1 to 1:5, for example, preferably, 3:1 to 1:3, and in particular, preferably, 1.5:1 to 1:1.5.

The coating compositions can also contain pigments and/or fillers. All colour and/or special effect-giving pigments of organic or inorganic type used in paints are suitable for pigments. Examples of inorganic or organic colour pigments are titanium dioxide, micronised titanium dioxide, iron oxide pigments, carbon black, azo pigments, phthalocyanine pigments, quinacridone or pyrrolopyrrole pigments. Examples of special effect pigments are metal pigments for example, from aluminum or copper, interference pigments, such as, for example, aluminum coated with titanium dioxide, coated mica, graphite effect pigments. Examples of fillers are silicon dioxide, barium sulphate, talcum, aluminium silicate and magnesium silicate.

The coating compositions can also contain usual additives. These additives are additives usually used in the paint industry. Examples of such additives are light stabilizers, for example, based on benztriazoles and HALS compounds, rheology additives different from the SCAB prepared according to the present invention, thickeners, such as, cross-linked polycarboxylic acid or polyurethanes, anti-foaming agents, wetting agents and catalysts for the crosslinking reaction. The additives are added in the usual amounts familiar to the person skilled in the art.

The coating compositions contain furthermore water, for example, 30-60% by weight, and possibly small amounts of organic solvents, e.g., up to 15% by weight, preferably, below 10% by weight based on the entire coating composition. The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, N-methylpyrrolidone and ketones, e.g., methyl ethyl ketone, acetone, cyclohexanone; aromatic or aliphatic hydrocarbons, for example, toluene, xylene, or straight-chain or branched aliphatic C6-C12-hydrocarbons. If organic solvents are present, water-miscible organic solvents are preferred.

The aqueous coating composition according to the invention can be produced in a known manner.

Either transparent or pigmented coating compositions can be produced. Therefore, the coating compositions according to the invention are suited for use as clear coats but can be pigmented with conventional pigments and used as solid-color or effect topcoats, color- and/or special effect-imparting basecoats or undercoats such as sealer, primer, surfacer or primer surfacer. They can be used to coat a substrate with a single coat or can be used within a multilayer coating of substrates. The aqueous coating compositions may comprise single-component aqueous coating compositions or aqueous coating compositions producible by mixing two or more separately stored components.

The coating compositions, according to the invention, can be applied using known methods, in particular, by spray application. The coating compositions obtained can be cured at room temperature or forced at higher temperatures, for example, up to 80° C., preferably at 20 to 60° C. They can, however, even be cured at higher temperatures of, for example, 80 to 180° C. Curing temperatures are depending on the curing chemistry as well as the field of use of the aqueous coating compositions The coating compositions, according to the invention, are suitable for automotive and industrial coatings. In the automotive coatings sector, the coatings can be used for both vehicle production line painting and vehicle and vehicle part refinishing as well as for coating large vehicles and transportation vehicles, such as, trucks, busses and railroad cars. For vehicle production line painting, baking temperatures of 80 to 180° C., for example, are used, preferably 110 to 140° C. For refinishing curing temperatures of for example, 20° C. to 80° C., in particular, 20 to 60° C. are used.

According to the present invention stable aqueous binder dispersions are provided, which can be easily incorporated into aqueous coating compositions. The binder dispersions can be prepared in a cost saving way from cheap renewable resources as main component. By using monomer a) as polymerization medium less amounts of organic solvents are required for the radical polymerization process and expensive destillation process can be avoided. Usually organic solvents need to be distilled off prior to or after conversion of the copolymer into the aqueous phase.

The aqueous coating compositions of the present invention show very good drying results compared with known aqueous coating compositions of prior art. In addition final coatings show improved hardness and scratch resistance as well as improved gloss and recoat adhesion. Even in higher film thicknesses of, for example 40-60 μm, pop-free coatings are obtained.

The invention will be further described by reference to the following Examples. All parts and percentages are on a weight basis unless otherwise indicated. All molecular weights disclosed herein are determined by GPC (gel permeation chromatography) using a polystyrene standard.

EXAMPLES

Example 1

Preparation of Acrylic Copolymer Dispersion with 35% Castor Oil on Polymer Solids as Polymerization Medium for a 2 Step Acrylic Copolymer In a reactor with a propeller type of stirrer, a thermometer, condenser and monomer/initiator feeding system, 630 grams of castor oil and 100 grams of ethoxypropanol (EPR) were loaded and heated to about 150° C. A mixture of 180 grams of 2-Hydroxyethyl methacrylate (HEMA), 360 grams of Styrene (S), 12 grams of Di-tertiary butyl peroxide (DTBP) and 28 grams of EPR were added over 2 hours 30 minutes to the reactor while keeping the contents at 150° C. After the feed, the reactor contents were held for 30 minutes. After the 30 minutes hold period, 180 grams of HEMA, 90 grams of AA, 360 grams of Isobutyl Methacrylate (IBMA), 6 grams of DTBP and 14 grams of EPR were added over 2 hours and 30 minutes at about 150° C. followed by a rinsing step for the feed system of 20 grams of EPR. After the rinsing step, the contents of the reactor were held for 2 hours at 150° C. followed by cooling to 100 C. In a next step, the 105.6 grams of dimethylamino ethanol (DMEA) were added for a theoretical acid value of 39, the amount corrected for the measured acid value.

The polymer blend was diluted with 1914.4 grams of water preheated at about 70° C.

Test Results:

| | |
|---|---|
| Solids | 44.9% |
| Viscosity | 2900 cps Brookfield spindle 2 at 10 rpm |
| Acid value | 40.6 mg KOH/g solids |
| pH | 8.65 |
| Mn | 3900 |
| Mw | 14100 |

Example 2

Preparation of Acrylic Copolymer Dispersion with 25% Castor Oil on Polymer Solids as Polymerization Medium for a 2 Step Acrylic Copolymer In a reactor with a propeller type of stirrer, a thermometer, condenser and monomer/initiator feeding system, 450 grams of castor oil and 100 grams of ethoxypropanol (EPR) were loaded and heated to about 150° C. A mixture of 180 grams of 2-Hydroxyethyl methacrylate (HEMA), 540 grams of Styrene (S), 12 grams of Di-tertiary butyl peroxide (DTBP) and 28 grams of EPR were added over 2 hours 30 minutes to the reactor while keeping the contents at 150° C. After the feed, the reactor contents were held for 30 minutes. After the 30 minutes hold period, 180 grams of HEMA, 90 grams of AA, 360 grams of Isobutyl Methacrylate (IBMA), 6 grams of DTBP and 14 grams of EPR were added over 2 hours and 30 minutes at about 150° C. followed by a rinsing step for the feed system of 20 grams of EPR. After the rinsing step, the contents of the reactor were held for 2 hours at 150° C. followed by cooling to 100 C. In a next step, the 105.6 grams of dimethylamino ethanol (DMEA) were added for a theoretical acid value of 39, the amount corrected for the measured acid value.

The polymer blend was diluted with 1914.4 grams of water preheated at about 70° C.

Test Results:

| | |
|---|---|
| Solids | 44.7% |
| Viscosity | 13100 cps Brookfield spindle 4 at 10 rpm |
| Acid value | 41.5 mg KOH/g solids |
| pH | 8.55 |
| Mn | 4100 |
| Mw | 26400 |

Example 3

Preparation of Acrylic Copolymer Dispersion with 35% Castor Oil on Polymer Solids as Polymerization Medium for a 1 Step Acrylic Copolymer In a reactor with a propeller type of stirrer, a thermometer, condenser and monomer/initiator feeding system, 630 grams of castor oil and 100 grams of ethoxypropanol (EPR) were loaded and heated to about 150° C. A mixture of 360 grams of 2-Hydroxyethyl methacrylate (HEMA), 90 grams of AA, 360 grams of Isobutyl Methacrylate (IBMA), 360 grams of Styrene (S), 18 grams of Di-tertiary butyl peroxide (DTBP) and 42 grams of EPR were added over 5 hours to the reactor while keeping the contents at 150° C. followed by a rinsing step for the feed system of 20 grams of EPR. After the rinsing step, the contents of the reactor were held for 2 hours at 150° C. followed by cooling to 100 C. In a next step, the 105.6 grams of dimethylamino ethanol (DMEA) were added for a theoretical acid value of 39, the amount corrected for the measured acid value.

The polymer blend was diluted with 3914.4 grams of water preheated at about 70° C.

Test Results:

| | |
|---|---|
| Solids | 40% |
| Viscosity | 500 cps Brookfield spindle 2 at 10 rpm |
| Acid value | 37.6 mg KOH/g solids |
| pH | 8.82 |
| Mn | 3700 |
| Mw | 20500 |

Example 4

Preparation of Acrylic Copolymer Dispersion with 19% Castor Oil on Polymer Solids and 24% of a Macromonomer as Polymerization Medium for a 1 Step Acrylic Copolymer In a reactor with a propeller type of stirrer, a thermometer, condenser and monomer/initiator feeding system, 372 grams of castor oil and 1116 grams of a macromonomer solution containing a macromonomer prepared as described in Example 1 U.S. Pat. No. 5,936,026 with a composition of 52% by weight methylmethacrylate (MMA), 28% by weight hydroxyethylmethacrylate (HEMA) and 20% by weight methacrylic acid (MAA) (43% solids in methyl ethyl ketone; Mn/Mw=1800/3000) were loaded and heated to about 87° C. A mixture of 384 grams of styrene (S), 368 grams of 2-Hydroxypropyl methacrylate (HPMA), 368 grams of Butyl Acrylate (BA), 20 grams of Tertiary butyl peroxy 2-ethylhexanoate (TBPO) and 112 grams of dipropyleneglycol mono methylether (DPM) were added over 3 hours to the reactor while keeping the contents at about 90° C. followed by a rinsing step for the feed system of 20 grams of DPM. After the rinsing step, 6 grams of TBPO in 22 grams of DPM were added in three equal portions after each portion keeping the reactor contents at about 9° C. for 90 minutes followed by a final rincing step with 20 grams of DPM. After this step, 636 grams of MEK were distilled of followed by a next step adding 109.2 grams of dimethylamino ethanol (DMEA) for a theoretical acid value of 39, the amount corrected for the measured acid value.

The polymer blend was diluted with 2090.8 grams of water preheated at about 70° C.

Test Results:

| | |
|---|---|
| Solids | 41.4% |
| Viscosity | 10200 cps Brookfield spindle 2 at 10 rpm |
| Acid value | 38 mg KOH/g solids |
| pH | 8.71 |
| Mn | 4800 |
| Mw | 13700 |

Example 5

Preparation of Acrylic Copolymer Dispersion with 25% Castor Oil on Polymer Solids as Polymerization Medium for a 2 Step Acrylic Copolymer In a reactor with a propeller type of stirrer, a thermometer, condenser and monomer/initiator feeding system, 450 grams of castor oil and 100 grams of ethoxypropanol (EPR) were loaded and heated to about 150° C. A mixture of 198 grams of 2-hydroxypropyl methacrylate (HPMA), 522 grams of styrene (S), 2 grams of Di-tertiary butyl peroxide (DTBP) and 28 grams of EPR were added over 2 hours 30 minutes to the reactor while keeping the contents at 150° C. After the feed, the reactor contents were held for 30 minutes. After the 30 minutes hold period, 198 grams of HPMA, 90 grams of AA, 342 grams of Isobutyl Methacrylate (IBMA), 6 grams of DTBP and 14 grams of EPR were added over 2 hours and 30 minutes at about 150° C. followed by a rinsing step for the feed system of 20 grams of EPR. After the rinsing step, the contents of the reactor were held for 2 hours at 150° C. followed by cooling to 100 C. In a next step, 105.6 grams of dimethylamino ethanol (DMEA) were added for a theoretical acid value of 39, the amount corrected for the measured acid value.

The polymer blend was diluted with 1914.4 grams of water preheated at about 70° C.

Test Results:

| | |
|---|---|
| Solids | 44.3% |
| Viscosity | 1140 cps |
| Acid value | 44.7 mg KOH/g solids |
| pH | 9.1 |

|       |       |
|-------|-------|
| Mn    | 4600  |
| Mw    | 16700 |

In all examples above castor oil from company Mosselmann. Belgium (Castor oil first pression, CAS nr: 8001-79-4) has been used

Comparative Example 1

Preparation of Acrylic Copolymer Dispersion with 35% by Weight of Coconut Oil as Polymerization Medium In a reactor with a propeller type of stirrer, a thermometer, condenser and monomer/initiator feeding system, 630 grams of Coconut oil and 100 grams of ethoxypropanol (EPR) were loaded and heated to about 150° C. A mixture of 180 grams of 2-Hydroxyethyl methacrylate (HEMA), 360 grams of Styrene (S), 12 grams of Di-tertiary butyl peroxide (DTBP) and 28 grams of EPR were added over 2 hours 30 minutes to the reactor while keeping the contents at 150° C. After the feed, the reactor contents were held for 30 minutes. After the 30 minutes hold period, 180 grams of HEMA, 90 grams of AA, 360 grams of Isobutyl Methacrylate (IBMA), 6 grams of DTBP and 14 grams of EPR were added over 2 hours and 30 minutes at about 150° C. followed by a rinsing step for the feed system of 20 grams of EPR. After the rinsing step, the contents of the reactor were held for 2 hours at 150° C. followed by cooling to 100 C. In a next step, the 105.6 grams of dimethylamino ethanol (DMEA) were added for a theoretical acid value of 39, the amount corrected for the measured acid value.

The polymer blend was diluted with 1914.4 grams of water preheated at about 70° C.

Initial Test Results:

|            |                                         |
|------------|-----------------------------------------|
| Solids     | 43.9%                                   |
| Viscosity  | 18000 cps Brookfield spindle 2 at 10 rpm |
| Acid value | 39 mg KOH/g solids                      |
| pH         | 8.93                                    |
| Mn         | 3100                                    |
| Mw         | 58200                                   |

The batch was not stable and phase separated.

Comparative Example 2

Preparation of Acrylic Copolymer Dispersion with 35% by Weight of Dehydrated Castor Oil as Polymerization Medium In a reactor with a propeller type of stirrer, a thermometer, condenser and monomer/initiator feeding system, 630 grams of Dehydrated castor oil and 100 grams of ethoxypropanol (EPR) were loaded and heated to about 150° C. A mixture of 180 grams of 2-Hydroxyethyl methacrylate (HEMA), 360 grams of Styrene (S), 12 grams of Di-tertiary butyl peroxide (DTBP) and 28 grams of EPR were added over 2 hours 30 minutes to the reactor while keeping the contents at 150° C. After the feed, the reactor contents were held for 30 minutes. After the 30 minutes hold period, 180 grams of HEMA, 90 grams of AA, 360 grams of Isobutyl Methacrylate (IBMA), 6 grams of DTBP and 14 grams of EPR were added over 2 hours and 30 minutes at about 150° C. During this feed the contents in the reactor became very viscous and gelled.

Comparative Example 3

Preparation of Acrylic Copolymer Dispersion without Castor Oil

In a reactor with a propeller type of stirrer, a thermometer, condenser and monomer/initiator feeding system, 200 grams of Cardura® E10 (CE10) (Glycidylester of C10 versatic acid available from Resolution) and 40 grams of ethoxypropanol (EPR) were loaded and heated to about 150° C. A mixture of 52 grams of 2-Hydroxyethyl methacrylate (HEMA), 160 grams of Styrene (S), 68 grams of acrylic acid (AA), 10 grams of Dicumylperoxide (DCP), 40 grams of Cardura® E10 and 10 grams of EPR were added over 2 hours 30 minutes to the reactor while keeping the contents at 150° C. After the feed, the reactor contents were held for 30 minutes. After the 30 minutes hold period, 108 grams of HEMA, 30.4 grams of AA, 141.6 grams of n-Butyl Methacrylate (BMA), 5 grams of DCP and 25 grams of EPR were added over 2 hours and 30 minutes at about 150° C. followed by a rinsing step for the feed system of 5 grams of EPR. After the rinsing step, the contents of the reactor were held for 2 hours at 150° C. In a next step, 33 grams of dimethylamino ethanol (DMEA) were added for a theoretical acid value of 29.5, the amount corrected for the measured acid value.

The polymer blend was diluted with 865 grams of water preheated at about 70° C.

Test Results:

|            |                     |
|------------|---------------------|
| Solids     | 44.8%               |
| Viscosity  | 8800 cps            |
| Acid value | 33.6 mg KOH/g solids |
| pH         | 8                   |
| Mn         | 3700                |
| Mw         | 24500               |

The solids content has been determined by drying the sample at 135° C. for 1 hour in an aluminium dish of 5 cm diameter.

Paint Examples

Paint Example 1

A white paint was prepared from a binder component and a white tint, the binder component containing the acrylic copolymer dispersion of Example 5.

The binder component was prepared by mixing the following ingredients:

92.3% by weight of acrylic copolymer dispersion of Example 5, 2.97% by weight of demineralized water, 1.8% by weight of diethylene glycol monobutyl ether, 0.90% by weight of Tinuvin 292 (light stabilizer), 2% by weight of Byketol WS (levelling agent from Byk) and 0.03% by weight of Byk 333 (wetting agent from Byk).

The tint was prepared by dispersing under high shear the following ingredients: 43.80% by weight of TiO$_2$ (TiPure® R-706), 7.8% by weight of a dispersing agent (graft copolymer according to example 2 of U.S. Pat. No. 5,231,131), 5.53% by weight of demineralized water, 0.12% by weight of AMP 95 (2-amino-2-methyl-propan-1-ol, Dow Chemicals), 0.45% by weight of Surfynol 104 (wetting agent, Air Products) and 0.45% by weight of ethylene glycol monobutyl ether. After dispersing 40.23% by weight of the acrylic copolymer dispersion of comparative example 3 was stirred in.

43.20% by weight of the binder component and 56.80% by weight of the tint (=base paint) were mixed, thinned with water to a spraying viscosity of 22" (DIN 4 cup 20° C., DIN EN ISO2431), and activated with a mixture of 19.31 g of the polyisocyanate curing agent Desmodur® N3900 (from Bayer), 1.67 g of Varsol 40 (high boiling point aliphatics, ExxonMobil) and 12.33 g of butyl glycol acetate (BASF) (per 100 g of base paint). The paint was sprayed in a resulting dry film thickness of 30-40 µm to a panel and baked (30 min. at 80° C.).

Comparative Paint Example 1

A paint according to paint example 1 was prepared, with the difference that the acrylic copolymer dispersion of Example 5 in the binder component was replaced by the acrylic copolymer dispersion of comparative example 3. The paint was sprayed and baked according to paint example 1.

The baked coating of paint example 1 exhibited a gloss of 86 units (at 20°) compared to a gloss of only 82 units for the baked coating of comparative paint example 1.

Paint Example 2

A black paint was prepared from the binder composition of paint example 1 and a black tint.

The black tint was prepared by grinding 6.79% by weight of carbon black (Raven 5000 Ultra II Powder; Columbian Chemicals) with 25.54% by weight of demineralized water, 10.91% by weight of a dispersing agent (graft copolymer according to example 2 of U.S. Pat. No. 5,231,131), 0.12% by weight of AMP 95 (2-amino-2-methyl-propan-1-01), 0.1% by weight of Surfynol 104 (wetting agent, Air Products), 0.1% by weight of ethylene glycol monobutyl ether. The tint was then diluted with 50.44% by weight of the acrylic copolymer dispersion of comparative example 3. 44.44% by weight of the binder composition of paint example 1 and 55.56% by weight of the black tint (=base paint) were mixed, thinned with water to a spraying viscosity of 22" (DIN 4 cup 20° C., DIN EN ISO2431) and activated with a mixture of 19.31 g of the polyisocyanate curing agent Desmodur® N3900 (Bayer), 1.67 g of Varsol 40 (high boiling point aliphatics, ExxonMobil) and 12.33 g of butyl glycol acetate (BASF) (per 100 g of base paint). The paint was sprayed in a resulting dry film thickness of 40-50 µm to a panel and baked (30 min. at 80° C.).

After three days, a second coat of the same black paint was sprayed in a resulting dry film thickness of 40-50 µm onto the first coat and baked on top of the first coat under the same conditions. The coated panel was left for ten days in a humidity cabinet (Bac Ford, 40° C.) and left to recover for one hour.

Comparative Paint Example 2

A paint according to paint example 2 was prepared, with the difference that the acrylic copolymer dispersion of Example 5 in the binder component was replaced by acrylic copolymer dispersion of comparative example 3.

The paint was sprayed and baked according to paint example 2.

The panels coated with paint 2 and comparative paint 2 were subjected to a High-Pressure Cleaning test (according to HPC Volvo, 423-0015; 120 bar, water temperature: 50° C., distance nozzle to substrate 10 cm, 2 sweeps/s, 30 s). In case of the coating with paint 2 delamination of the top coat (second coat) from the bottom coat (first coat) did not exceed 5% of the total area exposed. In contrast, in case of the coating with comparative paint 2 delamination did exceed 95% of the total area exposed.

The invention claimed is:

1. Aqueous coating composition comprising:
a cross-linkable binder resin and a liquid carrier, wherein said cross-linkable binder resin comprises a copolymer A) comprising:
5 to 64% by weight of a reaction product of at least one fatty acid having at least one ethylenic double bond and one hydroxyl group in the molecule with a polyalcohol having a hydroxyl functionality of 2 to 8, wherein the % by weight are relative to the binder solids of copolymer A) and wherein the fatty acid in the reaction product of at least one fatty acid having at least one ethylenic double bond and one hydroxyl group in the molecule with a polyalcohol having a hydroxyl functionality is ricinoleic acid.

2. Aqueous coating composition of claim 1, wherein the copolymer A) comprises 10 to 50% by weight of the reaction product of at least one fatty acid having at least one ethylenic double bond and one hydroxyl group in the molecule with a polyalcohol having a hydroxyl functionality of 2 to 8, wherein the % by weight are relative to the binder solids of copolymer A).

3. Aqueous coating composition of claim 1 or 2, wherein copolymer A) has an acid number of at least 10 mg KOH/g solids.

4. Aqueous coating composition of claim 3, wherein copolymer A) has an acid number of 15 to 80 mg KOH/g solids.

5. Aqueous coating composition of claim 1, wherein copolymer A) has a hydroxyl number of 50 to 250 mg KOH/g solids and a number average molecular weight Mn of 800 to 8000.

6. Aqueous coating composition of claim 1, wherein copolymer A) comprises
a) 5 to 64% by weight of the reaction product of ricinoleic acid with a polyalcohol having a hydroxyl functionality of 2 to 8 and
b) 36 to 95% by weight of unsaturated monomers comprising:
b1) at least one hydroxyl-functional unsaturated monomer,
b2) at least one acid-functional unsaturated monomer and
b3) optionally at least one other polymerizable unsaturated monomer different from monomers b1) and b2), wherein the % by weight of a) and b) are adding up to 100%.

7. Aqueous coating composition of claim 1, wherein copolymer A) comprises
a) 5 to 64% by weight of the reaction product of ricinoleic acid with a polyalcohol having a hydroxyl functionality of 2 to 8,
b1) 0 to 60% by weight of at least one hydroxyalkyl ester with at least one primary or secondary hydroxyl group derived from alpha, beta-ethylenically unsaturated monocarboxylic acids,
b2) 2 to 40% by weight of at least one unsaturated acid functional monomer,
b3.1) 0 to 50% by weight of at least one ester of (meth) acrylic acid with aliphatic monohydric branched or linear as well as cyclic alcohols with 1 to 20 C atoms and
b3.2) 0 to 50% by weight of at least one unsaturated vinyl aromatic monomer, wherein the % by weight of reaction product a) and monomers b1) to b3.2) are adding up to 100%.

8. Aqueous coating composition of claim 1, wherein the reaction product of at least one fatty acid having at least one ethylenic double bond and one hydroxyl group in the molecule with a polyalcohol having a hydroxyl functionality of 2 to 8 is the triglyceride of ricinoleic acid.

9. Aqueous coating composition of claim 1, wherein the reaction product of at least one fatty acid having at least one ethylenic double bond and one hydroxyl group in the molecule with a polyalcohol having a hydroxyl functionality of 2 to 8 is castor oil.

10. Aqueous coating composition of claim 1, wherein the copolymer A) is prepared by polymerizing monomers b1) to b3) in the presence of at least 20% by weight of the total amount of the reaction product of ricinoleic acid with a polyalcohol having a hydroxyl functionality of 2 to 8.

11. Aqueous coating composition of claim 6, wherein the copolymer A) is a graft copolymer comprising:

8-92% by weight of the graft copolymer of a polymeric backbone of polymerized reaction product a) and monomers b) and further comprising 92-8% by weight of the graft copolymer, of a macromonomer c) attached to said polymeric backbone at a single terminal point of said macromonomer, wherein the % by weight are adding up to 100%, said macromonomer having a number average molecular weight Mn of 500-8000 and comprising 10 to 100% by weight of the macromonomer of ethylenically unsaturated acid-functional and/or amine-functional monomers.

12. Aqueous coating composition of claim 11, wherein the copolymer A) is prepared by polymerizing monomers b1) to b3) in presence of a mixture of 20 to 80% by weight of the reaction product a) of at least one fatty acid having at least one ethylenic double bond and one hydroxyl group in the molecule with a polyol having a hydroxyl functionality of 2 to 8 and 20 to 80% by weight of macromonomer c), wherein the % by weight are adding up to 100%.

13. Aqueous coating composition of claim 1, further comprising a cross-linking agent.

14. A process for the preparation of a coating layer, comprising the successive steps:
1) applying a coating layer from a coating composition of claim 1 to a substrate,
2) optionally, flashing off the applied coating layer to remove volatile compounds, and
3) curing the coating layer.

15. The process of claim 14, wherein the coating layer is selected from the group consisting of a single-layer coating and a coating layer within a multilayer coating.

16. The process of claim 14 or 15, wherein the coating layer is selected from a group consisting of a clear top coat layer and a pigmented single-stage top coat layer.

* * * * *